United States Patent
Binder-Krieglstein

(10) Patent No.: US 6,349,010 B1
(45) Date of Patent: Feb. 19, 2002

(54) APPARATUS FOR RECORDING DATA IN PARALLEL TRACKS

(75) Inventor: Wolfgang Binder-Krieglstein, Wien (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/281,352

(22) Filed: Mar. 30, 1999

(30) Foreign Application Priority Data

Apr. 2, 1998 (EP) .............................. 98201046

(51) Int. Cl.[7] .................... G11B 5/584; G11B 15/12
(52) U.S. Cl. .................... 360/77.12; 360/63; 360/48
(58) Field of Search .............................. 360/61, 63, 48, 360/73.04, 22, 77.12, 77.13, 77.02, 75

(56) References Cited

FOREIGN PATENT DOCUMENTS

| EP | 0427008 A2 | 5/1991 |
|----|------------|--------|
| WO | 9630897 A2 | 10/1996 |
| WO | 9733274 A1 | 9/1997 |

*Primary Examiner*—Andrew Sniezek
(74) *Attorney, Agent, or Firm*—Bernard Franzblau

(57) ABSTRACT

A recording apparatus includes a thin film magnetic head (20) with eight write units (21–28) positioned adjacent to each other in a transversal direction (y) to write data in parallel tracks on a magnetic tape (10). Switching arrangement 70 has a switch (SW) to switch from a normal mode to a combination mode. In the normal mode the switch is in a first position (D1) and the switching arrangement (70) couple a first data signal (S1) to a first write unit (21), a second data signal (S2) to a second write unit (22) etc., so that in the normal mode eight tracks (T21–T28) are written on the tape resulting in a first track density. In the combination mode the switch is in a second position (D2) and the switching arrangement couples the first data signal (S1) to the first and second write units (21 and 22), the second data signal (S2) to the third and fourth write units (23 and 24) etc. Hence, in the combination mode, four tracks (T1–T4) are written on the tape resulting in a second track density which is half the first track density. This second track density corresonds to the density of the write units of a magnetic head (2) of an apparatus (not shown) of an older generation.

10 Claims, 4 Drawing Sheets

APPARATUS FOR RECORDING DATA IN PARALLEL TRACKS

BACKGROUND OF THE INVENTION

The invention relates to an apparatus for simultaneously writing a plurality of data signals in parallel data tracks in a longitudinal direction on a recording medium, the apparatus comprising a head having a plurality of write units which are positioned adjacent to each other in a transversal direction which is transverse to said longitudinal direction, which write units directly adjoin each other in the transversal direction and transport means for moving the head and the recording medium relative to each other in the longitudinal direction.

The invention also relates to an information storage system comprising a recording medium and an apparatus for simultaneously writing a plurality of data signals in parallel data tracks in a longitudinal direction on the recording medium, the apparatus comprising a head having a plurality of write units which are positioned adjacent to each other in a transversal direction which is transverse to said longitudinal direction, which write units directly adjoin each other in the transversal direction and transport means for moving the head and the recording medium relative to each other in the longitudinal direction.

The invention further relates to a method of simultaneously writing a plurality of data signals in parallel data tracks in a longitudinal direction on a recording medium with a head having a plurality of individually addressable write units which are positioned adjacent to each other in a transversal direction which is transverse to said longitudinal direction, which write units directly adjoin each other in the transversal direction, the head and medium being moved relative to each other in the longitudinal direction.

Such an apparatus, such a system and such a method are known from WO-A-97/33274. The known apparatus is suitable for co-operation with a magnetic tape. The apparatus has two reel spindles to move the magnetic tape past a thin-film magnetic head in a longitudinal direction. The magnetic head comprises a head face with a plurality of write units which adjoin each other in a transverse direction which is transverse to the longitudinal direction. A plurality of parallel data tracks can be simultaneously written on the magnetic tape with these write units. Because the write units directly adjoin each other, a large number of tracks can be written on the tape.

SUMMARY OF THE INVENTION

It is an object of the invention to provide an apparatus as defined in the preamble, which is compatible with apparatuses of an older generation. To achieve this object, the apparatus according to the invention is characterised in that the apparatus comprises switching means to switch the apparatus from a normal mode wherein each data signal is coupled to a single write unit to write data tracks with a first track density, each data track being written by a single write unit, to a combination mode wherein each data signal is coupled to a group of parallel, adjoining write units to write data tracks with a second track density which is a portion of the first track density, each data track being written by such a group of write units. The second track density may be a fraction of the first track density. Due to these measures, data tracks with two different track densities can be written with the same magnetic head. This is very advantageous because the replacement of a first generation apparatus by a second generation apparatus according to the invention with a greater data track density does not require the "old" tapes recorded by the first generation apparatus to be transferred to a second generation tape in order to be able to update the information stored on them with the second generation apparatus. Instead the "old" tapes can be updated by the second generation apparatus because it can also write with the track density of the first generation apparatus. By writing the old tapes with the track density of the first generation apparatus the recording is more reliable and the data can be read by apparatuses of the first generation. It is very important that the write units directly adjoin each other in the transversal direction because the apparatus must be able to overwrite data already recorded on the medium. If there would be a gap between two write units of a group, "old data" written by a first generation apparatus would remain on the recording medium. This old data would disturb the read-out of the newly recorded data by a first generation apparatus. With the measures according to the invention, it is achieved that the apparatus is compatible with apparatuses of an older generation.

It is to be noted that EP-A-0 427 008 shows a helical scan unit having two adjacent magnetic heads which can be switched in parallel to obtain a synthetic unit formed by the units of the two adjacent magnetic heads. However, this apparatus is not suitable for simultaneously writing a plurality of parallel data tracks.

The measure as defined in dependent claim 2 has the advantage that it enables a great track density to be achieved. Because the units are spaced in the longitudinal direction there is more space to construct the write unit and there is more space to make electrical connections. For example, a magnetic head as disclosed in WO-A-97/33274 (incorporated herein by reference) can be used. Preferably, a thin-film magnetic head is used. By adding the specified delay in the combination mode, the phases of the track parts written by the first write unit and the second write unit are matched. As a result these tracks can be read with a first generation apparatus having read units with a width corresponding to the track width.

The measure as defined in dependent claim 3 has the advantage that a very great track density can be achieved. Because the magnetic head can actively follow the servo track during writing and/or reading, the data track width can be made smaller than the movements of the medium in the transversal direction during recording and thus the data track density can be increased considerably. For example, the servo could be a buried servo system as described in WO-A-96/30897 (incorporated herein by reference).

The measure as defined in dependent claim 4 has the advantage that the track density is optimal both in the combination mode and in the normal mode.

The measures as defined in dependent claim 5 have the advantage that information can be recorded with three different track densities. This is advantageous when three generations of a recording system are used for reading and/or writing the same set of recording media.

The measure as defined in dependent claim 6 has the advantage that the apparatus automatically selects the right mode dependent on the data track density on the recording medium. This detection can be performed for example by comparing signals from adjacent read units or by detecting a property, for example the presence of a hole, of a cassette in which the recording medium is housed.

The system according to the invention is characterised in that the recording medium comprises at least one servo signal present in a servo track extending in the longitudinal direction, and in that the apparatus comprises an actuator for positioning the head and the recording medium relative to each other in the transversal direction, at least one read unit to read the at least one servo signal from the recording medium and servo means adapted to drive the actuator dependent on the servo signal read by the read unit so that the head will follow the servo track, and in that the apparatus comprises switching means to switch the apparatus from a normal mode wherein each data signal is coupled to a single write unit to write data tracks with a first track density, each data track being written with a single write unit, to a combination mode wherein each data signal is coupled to a group of parallel, adjoining write units to write data tracks with a second track density which is a part of the first track density, each data track being written by such a group of write units.

The measure as defined in dependent claim 8 has the advantage that a servo signal can easily be generated by comparing the signal from one read unit with that from the other unit. The sensitivity of this servo signal is increased when the dimension of the read units in the transversal direction is reduced. This is advantageous as later generations will employ a greater track density, resulting in smaller read units, but also require a better positioning accuracy of the head relative to the recording medium because the tracks are narrower. Hence, the recording medium can be used by different generations of apparatuses employing a tracking servo.

The method according to the invention is characterised in that each data signal is coupled to a group of adjoining write units so that each data track is written by such a group of write units.

These and other aspects of the invention will be apparent from and elucidated with reference to the embodiments described hereafter.

DESCRIPTION OF THE PREFERRED EMBODIMENTS

Figure 1:
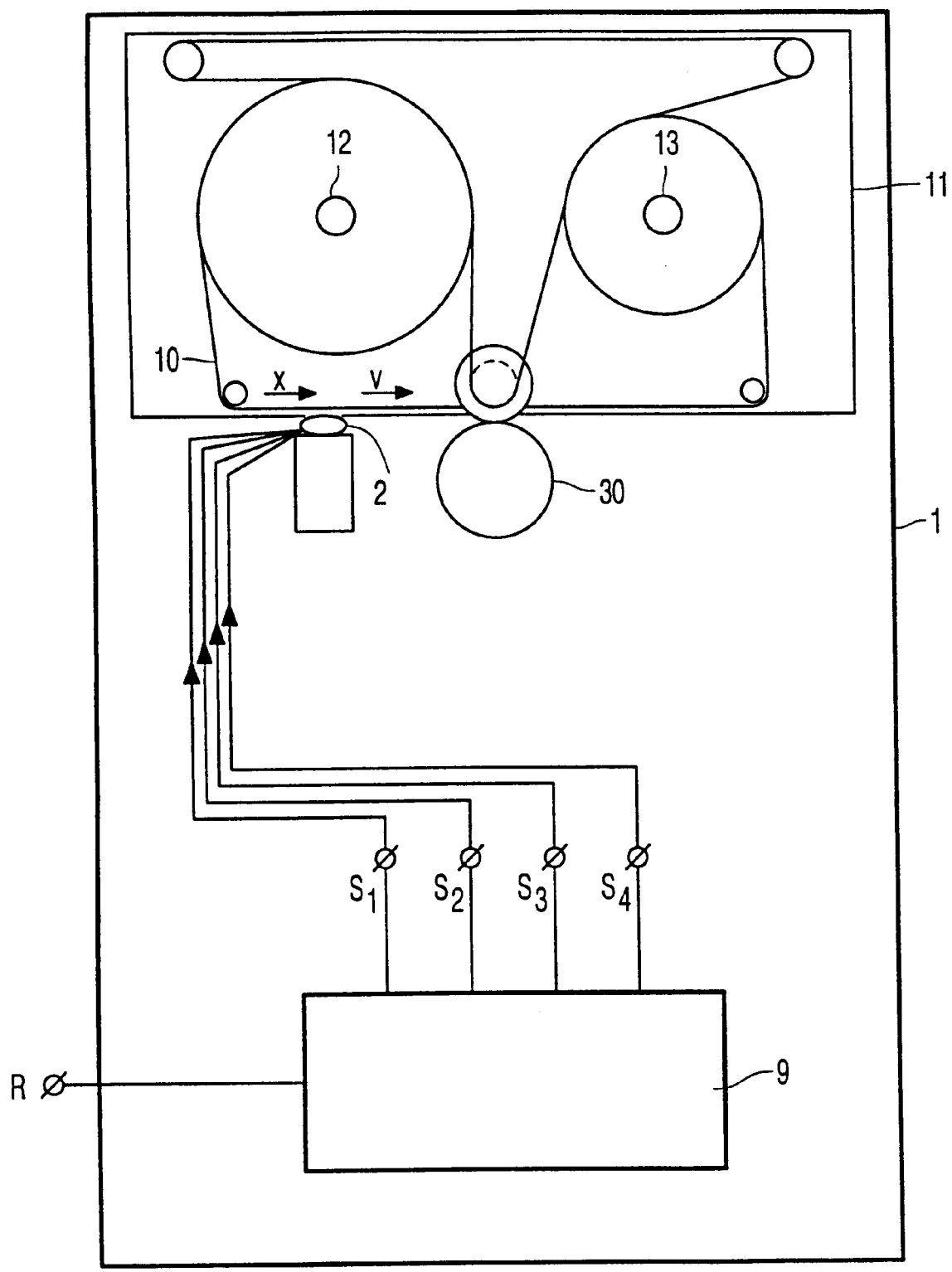
FIG. 1 diagrammatically shows a first generation apparatus 1 and a recording medium, in the present case a magnetic tape 10 wound on cores 12 and 13 accommodated in the housing of a cassette 11, FIG. 2 diagrammatically shows a second generation apparatus 100 in accordance with the invention, FIG. 3 diagrammatically shows a magnetic tape 10 and details of a first embodiment of the apparatus in accordance with the invention, FIG. 4 diagrammatically shows a magnetic tape 110 and details of a second embodiment of the apparatus according to the invention and FIG. 5 diagrammatically shows a magnetic tape provided with a servo track and a magnetic head of an apparatus in accordance with the invention in two different positions.

FIG. 1 shows a first generation apparatus 100 and a magnetic tape 10 wound on cores 12 and 13 accommodated in the housing of a cassette 11. The apparatus 100 comprises a magnetic head 2 and transport means, in the present case a motor 30, for moving the magnetic tape 10 with respect to the magnetic head 2 in a longitudinal direction x with a speed V. A multiplexer 9 is provided to convert a signal R to be recorded into a plurality of data signals S1–S4. The data signals S1–S4 are coupled to write units 5–8 respectively (see FIG. 3) of the magnetic head 2.

Figure 2:
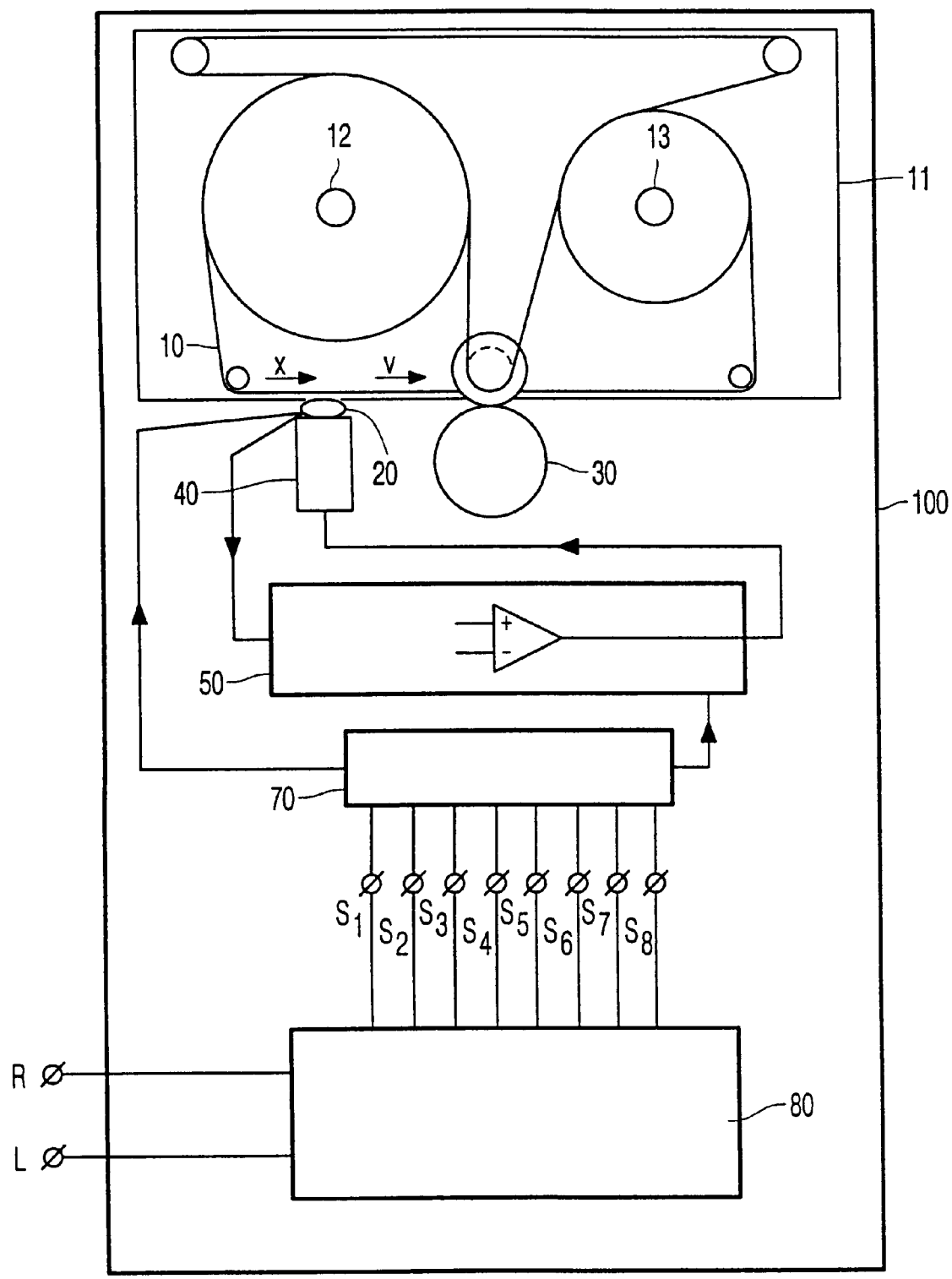

FIG. 2 shows an embodiment of the system in accordance with the invention. The system includes a second generation linear recording apparatus 100 and a recording medium in the form of the magnetic tape 10 wound on cores 12 and 13 accommodated in the housing of the cassette 11. The apparatus 100 comprises a magnetic head 20 and transport means, in the present case the motor 30, for moving the magnetic tape 10 with respect to the magnetic head 20 in a longitudinal direction x with a speed V. A multiplexer 80 is provided to convert a signal R to be recorded into a plurality of data signals S1–S4 and to convert a signal L to be recorded into a plurality of data signals S5–S8. The apparatus 100 further comprises switching means 70 for coupling the data signals S1–S8 to the magnetic head 20. In an improved version the apparatus 100 further comprises an actuator 40, for moving the magnetic head 20 transversely to the longitudinal direction x, and a servo circuit 50, arranged between the magnetic data head 20 and the actuator 40.

Figure 3:
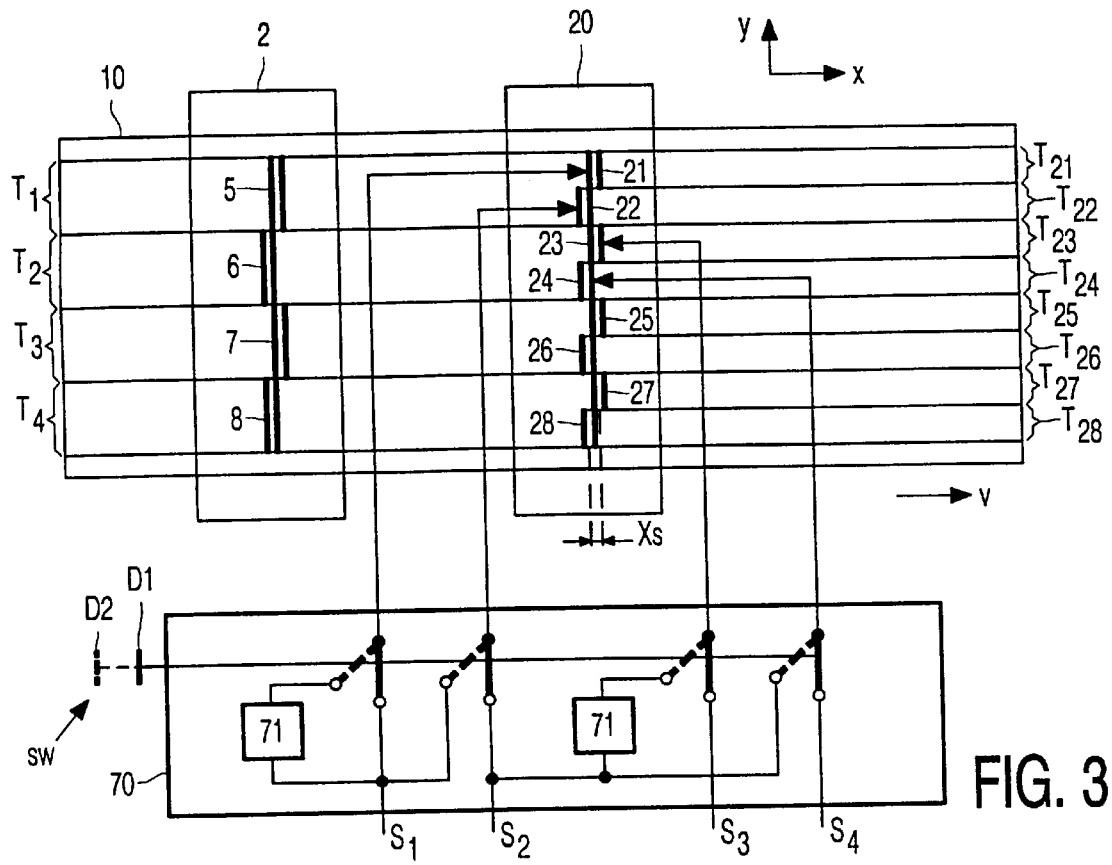

FIG. 3 shows the magnetic head 2 of the first generation apparatus, the magnetic head 20 of the second generation apparatus, and the magnetic tape 10. The magnetic head 2 is a thin film magnetic head with four write units 5–8 positioned adjacent to each other in a transversal direction y which is transverse to the longitudinal direction x and is used to write four parallel tracks T1–T4. The magnetic head 20 is a thin film-magnetic head with write units 21–28 positioned adjacent to each other in the transversal direction y. The switching means 70, which belong to the second generation apparatus, are provided with a switch SW to switch from a normal mode to a first combination mode. In the normal mode the switch SW is in position D1 and the switching means 70 couple the data signal S1 to write unit 21, data signal S2 to write unit 22 etc. (only shown for write units 21 to 24). Hence, in the normal mode eight tracks T21–T28 are written on the tape, resulting in a first track density. In the first combination mode the switch SW is in position D2 and the switching means 70 couple the data signal S1 to write units 21 and 22, data signal S2 to write unit 23 and 24 etc. (only shown for write units 21 to 24). The switching means 70 comprise delay circuits 71 to delay in the first combination mode the signals S1, S2, S3 and S4 coupled to the write units 22, 24, 26 and 28 with respect to the signals coupled to the write units 21, 23, 25 and 27 respectively. The delay is equal to the spacing Xs between the write units 21, 23, 25, 27 and 22, 24, 26, 28 divided by the speed V with which the tape 10 is moved past the head 20 in the longitudinal direction x. This delay serves to match the phases on tape of the signals written in each of the tracks T1–T4 by parallel write units in the first combination mode. Hence, in the first combination mode, the signal R is written in four tracks T1–T4 on the tape 10, resulting in a second track density which is half the first track density. This second track density corresponds to the density of the write units 5–8 of the magnetic head 2 of the first generation apparatus 1.

Figure 4:
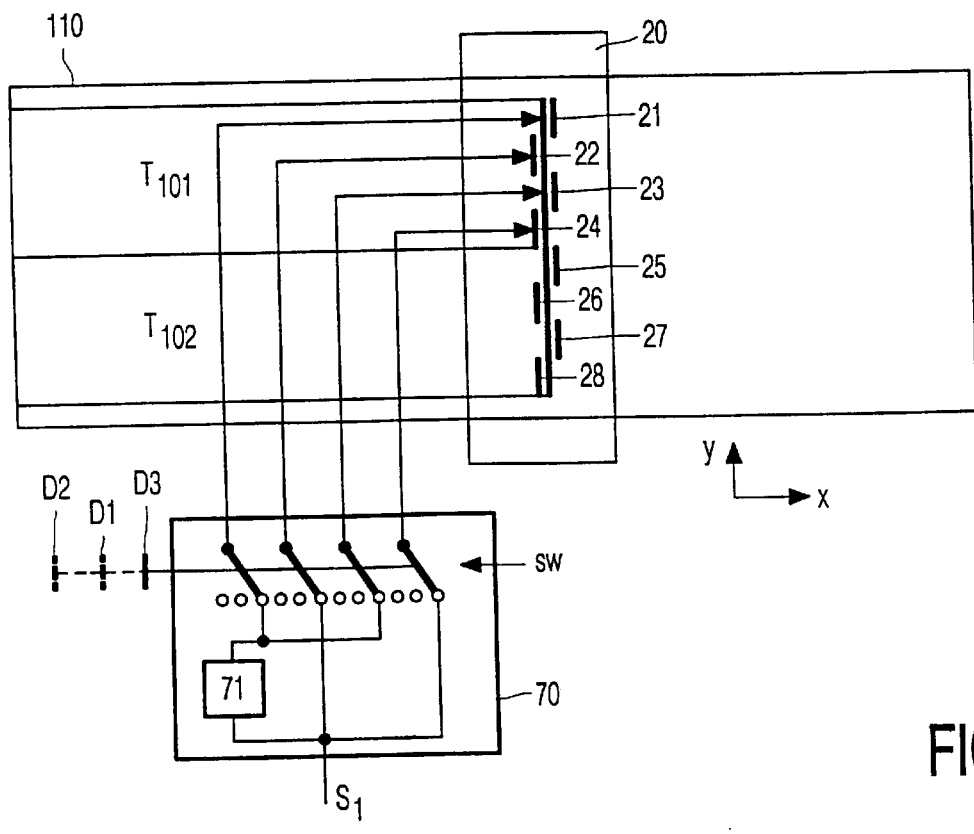

FIG. 4 shows a magnetic tape 110 and details of a second embodiment of the apparatus according to the invention. In this second embodiment, the switching means 70 comprise a switch SW with three positions D1, D2 and D3. Positions D1 and D2 correspond to the normal mode and the first combination mode respectively as shown with reference to FIG. 3. Position D3 corresponds to a second combination mode. In the second combination mode the switching means 70 (partly shown) couple the data signal S1 directly to write units 22 and 24 and via the delay 71 to write units 21 and 23. In addition, data signal S2 is coupled (not shown) directly to write unit 26 and 28 and via delay means to write units 25 and 27. Again this delay serves to match the phases on tape of the signals written in each of the tracks T101 and T102 by parallel write units in the combination mode. Hence, in the second combination mode, two tracks T101 and T102 are written on the tape 10, resulting in a third track density which is a quarter of the first track density.

Figure 5:
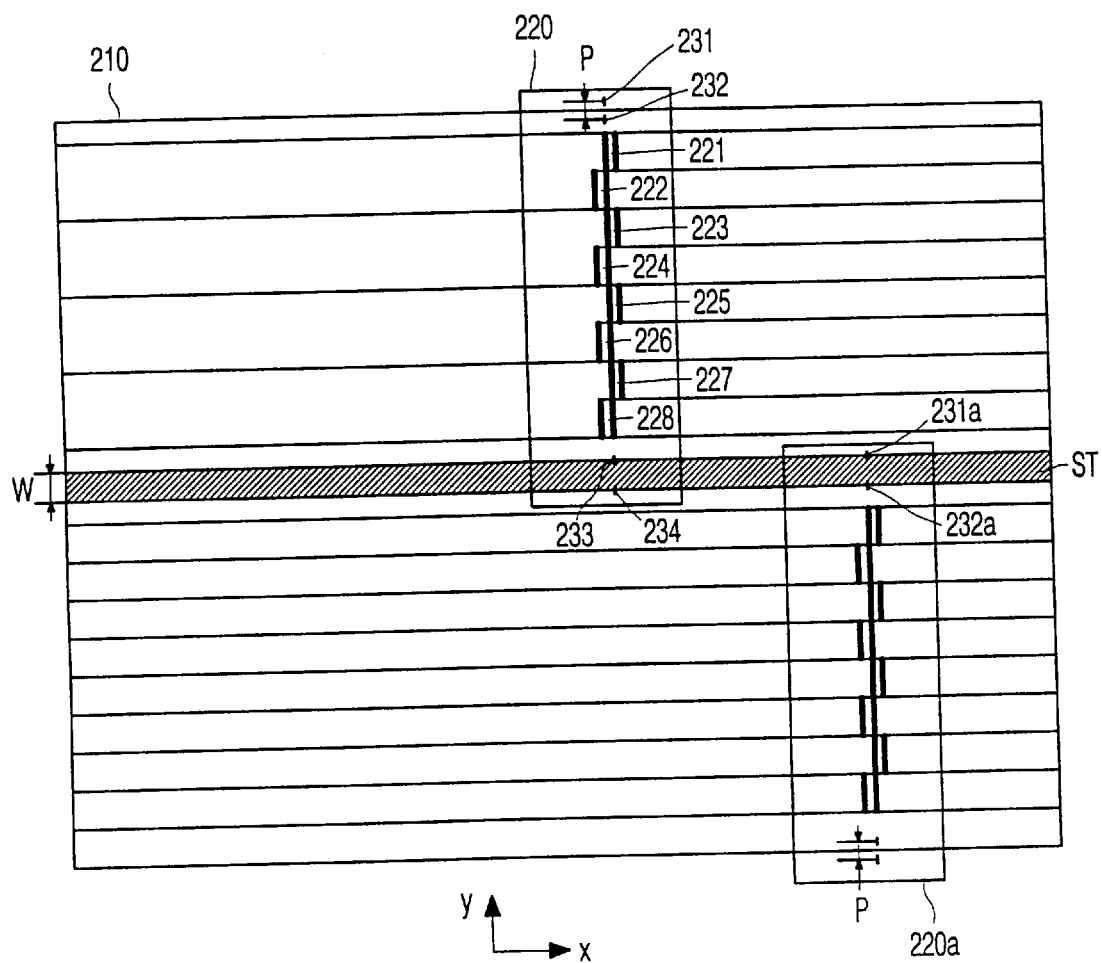

FIG. 5 shows a magnetic tape 210 and a magnetic head in two different positions denoted by reference numerals 220 and 220a. The magnetic tape 210 comprises a servo track ST which contains a servo signal, for example a sinus-shaped signal. The magnetic head 220 comprises read units 231–234 which are coupled to the servo circuit 50 shown in FIG. 1. In a first pass the magnetic head is denoted by reference numeral 220 and is positioned on the upper half of the tape 210. During this first pass the read units 233 and 234 are positioned partly on the servo track ST. The pitch W of the read units is substantially equal to the width W of the servo track ST so that when the tape 210 moves in the positive y-direction relative the magnetic head 220, the amplitude of the signal read by unit 233 increases and the amplitude of the signal read by unit 234 decreases. When the tape 210 moves in the negative y-direction relative the magnetic head 220, the amplitude of the signal read by unit 233 increases and the amplitude of the signal read by unit 234 decreases. By subtracting the signals from units 233 and 234 from each other, a position signal is obtained that is indicative of the position of the head 220 relative to the servo track ST. By driving the actuator 40 shown in FIG. 1 in dependence on this position signal it is achieved that the head 220 will follow the servo track ST.

In a second pass the magnetic head is denoted by reference numeral 220a and is positioned on the lower half of the tape 210. During this second pass the read units 231a and 232a are positioned partly on the servo track ST. During the second pass the position signal is generated from the read units 231a and 232a in the same way as described above.

It is to be noted that the invention is not limited to the embodiments disclosed herein. Various other embodiments are possible within the scope of the invention. It is possible, for example, to use an optical head and/or an optical or magneto-optical recording medium. It is also possible to use a disc shaped medium instead of a tape-shaped medium. Further, the head may comprise data read units integrated in the write units or the apparatus may comprise a separate head for reading data tracks.

What is claimed is:

1. An apparatus for simultaneously writing a plurality of data signals in parallel data tracks in a longitudinal direction on a recording medium, the apparatus comprising:

a head having a plurality of write units which are positioned adjacent to each other in a transversal direction which is transverse to said longitudinal direction, which write units are directly adjacent each other in the transversal direction, transport means for moving the head and the recording medium relative to each other in the longitudinal direction, and switching means to switch the apparatus from a normal mode wherein each data signal is coupled to a single respective write unit to write data tracks with a first track density, each data track being written by a single write unit, to a combination mode wherein each data signal is coupled to a respective group of parallel, adjacent write units to write data tracks with a second track density which is a portion of the first track density, each data track being written by such a group of write units.

2. An apparatus as claimed in claim 1, characterised in that at least one such group of write units comprises a first write unit and a second write unit which are spaced relative to each other in the longitudinal direction, and the apparatus comprises delay means to delay, in the combination mode, the signal coupled to the first write unit with respect to the signal coupled to the second write unit, the delay being substantially equal to the spacing between the first write unit and the second write unit divided by the speed with which the head and the recording medium are moved relative to each other in the longitudinal direction.

3. An apparatus as claimed in claim 1, which further comprises;

an actuator for positioning the head and the recording medium relative to each other in the transversal direction, at least one read unit to read a servo signal from the recording medium and servo means adapted to drive the actuator dependent on the servo signal read by the read unit so that the head will follow the servo track.

4. An apparatus as claimed in claim 1, characterised in that all write units have the same dimension in the transversal direction.

5. An apparatus as claimed in claim 1, characterised in that the switching means couple each data signal to two adjacent write units in a first combination mode, and couple each data signal to four adjacent write units in a second combination mode.

6. An apparatus as claimed in claim 1, which further comprises detection means for detecting a parameter indicative of the track density of data tracks already present on the recording medium, and wherein the detection means are coupled to the switching means to select a mode corresponding to the detected track density.

7. An information storage system comprising a recording medium and an apparatus for simultaneously writing a plurality of data signals in parallel data tracks in a longitudinal direction on the recording medium, the apparatus comprising a head having a plurality of write units which are positioned adjacent to each other in a transversal direction which is transverse to said longitudinal direction, which write units directly adjacent each other in the transversal direction, and transport means for moving the head and the recording medium relative to each other in the longitudinal direction, characterised in that the recording medium comprises at least one servo signal present in a servo track extending in the longitudinal direction, and the apparatus further comprises an actuator for positioning the head and the recording medium relative to each other in the transversal direction, at least one read unit to read the at least one servo signal from the recording medium, and servo means adapted to drive the actuator dependent on the servo signal read by the read unit so that the head will follow the servo track, and switching means to switch the apparatus from a normal mode wherein each data signal is coupled to a single respective write unit to write data tracks with a first track density, each data track being written by a single write unit, to a combination mode wherein each data signal is coupled to a respective group of parallel, adjacent write units to write data tracks with a second track density which is a portion of the first track density, each data track being written by such a group of write units.

8. A system as claimed in claim 7, characterised in that the head comprises at least two read units for reading the servo signal in the servo track on the recording medium, the pitch of said read units corresponding to the width of the servo track.

9. A method of simultaneously writing a plurality of data signals in parallel data tracks in a longitudinal direction on a recording medium with a head having a plurality of individually addressable write units which are positioned adjacent to each other in a transversal direction which is transverse to said longitudinal direction, which write units are directly adjacent each other in the transversal direction, the method comprising; moving the head and recording medium relative to each other in the longitudinal direction, and coupling each data signal a respective group of adjacent write units so that each data track is written by such a group of write units.

10. The method as claimed in claim 9, wherein at least one such group of write units of a head comprises a first write unit and a second write unit which are spaced relative to each other in the longitudinal direction, the method comprising delaying the data signal coupled to the first write unit with respect to the data signal coupled to the second write unit, the delay being substantially equal to the spacing between the first write unit and the second write unit divided by the speed with which the head and the medium are moved relative to each other in the longitudinal direction.

* * * * *